July 24, 1956　　　G. A. BRACE　　　2,755,883
SUCTION CLEANERS

Filed Jan. 7, 1954　　　4 Sheets-Sheet 1

July 24, 1956   G. A. BRACE   2,755,883
SUCTION CLEANERS

Filed Jan. 7, 1954   4 Sheets-Sheet 3

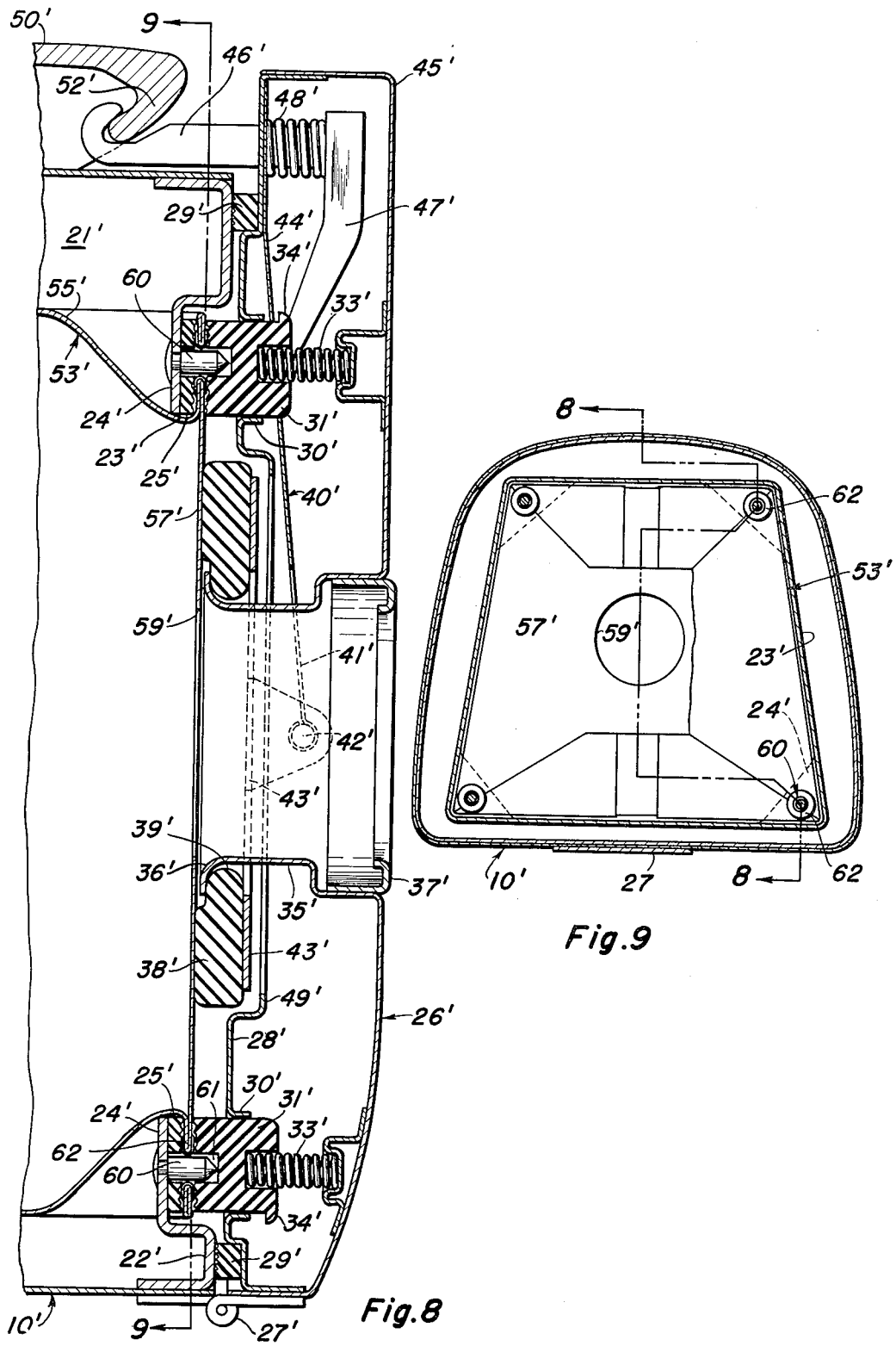

United States Patent Office 2,755,883
Patented July 24, 1956

2,755,883

SUCTION CLEANERS

George A. Brace, Highland Park, Ill., assignor to The Hoover Company, North Canton, Ohio, a corporation of Ohio Application January 7, 1954, Serial No. 402,717

14 Claims. (Cl. 183—37)

The invention relates to suction cleaners and more particularly to an improved throw-away paper filter and a suction cleaner construction having unique means for clamping the improved filter in place therein as an incident to the closing of the filter chamber.

One of the troublesome problems attending the use of throw-away paper filters has been a simple, fool proof and effective means for clamping the filter bag in place in the cleaner. Many solutions have been proposed but all are subject to numerous disadvantages which have been overcome by the present invention. For example, in previous designs it has been necessary for the operator to clamp the bag in place on some part of the cleaner and thereafter close and lock the end cap in place. In some instances, the filter bag is clamped to an extension tube carried on the inner side of the end, while in other the filter is clamped to the side wall or across the wide mouth of the filter chamber. In either case, the operator is required to hold the flexible walls of the filter in place while closing the clamp. This is a difficult operation which must be performed with care to avoid leaving an unclamped area through which dirty air can escape.

In another category of the prior art, the filter bag is provided with a stiff cardboard plate projecting beyond the side walls of the filter and serving as a mounting plate for the filter. These have the disadvantage of adding appreciably to the cost of the filters as well as to the difficulty of manufacturing the filters and packaging them for shipment.

The present invention avoids these serious disadvantages and provides a filter bag of unusual simplicity and low manufacturing cost. The filter is made from a single rectangular blank of air pervious paper and folds flat for compact packaging. Moreover, it is so constructed that it can be dropped into the open filter chamber and clamped in place merely by closing the end cap. The small area inlet opening of the filter registers automatically with the cleaner hose coupling and the latching of the end cap suffices to bring a sealing gasket into place against the wall of the filter bag in the area immediately surrounding the inlet opening therein. Likewise, unlatching of the end cap releases both the end cap and the sealing gasket leaving the filter exposed in readiness for withdrawal and disposal. Another feature of the design is the provision of a filter having an irregularly shaped end wall adapted to seat in a similarly shaped shallow well at the cleaner inlet opening. This arrangement assures that the filter will be assembled in the correct orientation for most efficient operation.

Accordingly, it is a primary object of this invention to provide a novel suction cleaner as well as a novel and less expensive throw-away paper filter for use therewith.

Another object is the provision of a suction cleaner in which the filter bag is clamped in place as an incident to the closing of the end cap and more particularly one in which a sealing device for the filter is operatively associated with the end cap latching means so as to be actuated simultaneously therewith.

Another object is the provision of a suction cleaner provided with means for gripping the corners of the filter bag end wall as the end cap closes to hold the filter in the proper position in the filter chamber and with the filter inlet in registry with the cleaner air inlet passageway.

Yet another object is the provision of a suction cleaner having a filter mounting ring adapted to interfit with a complementarily shaped wall of a throw-away filter as the filter is dropped into the filter chamber whereby the filter is held in the proper oriented position to be clamped by the closing of the end cap.

Numerous other objects and advantages of the invention will become apparent from the following detailed specification of illustrative embodiments of the invention taken in connection with the accompanying drawings, wherein:

Figure 8 is a vertical sectional view through the end cap and filter clamping means of a second embodiment of the invention taken along line 8—8 on Figure 9; and Figure 9 is a vertical sectional view taken along line 9—9 on Figure 8.

Figure 1:
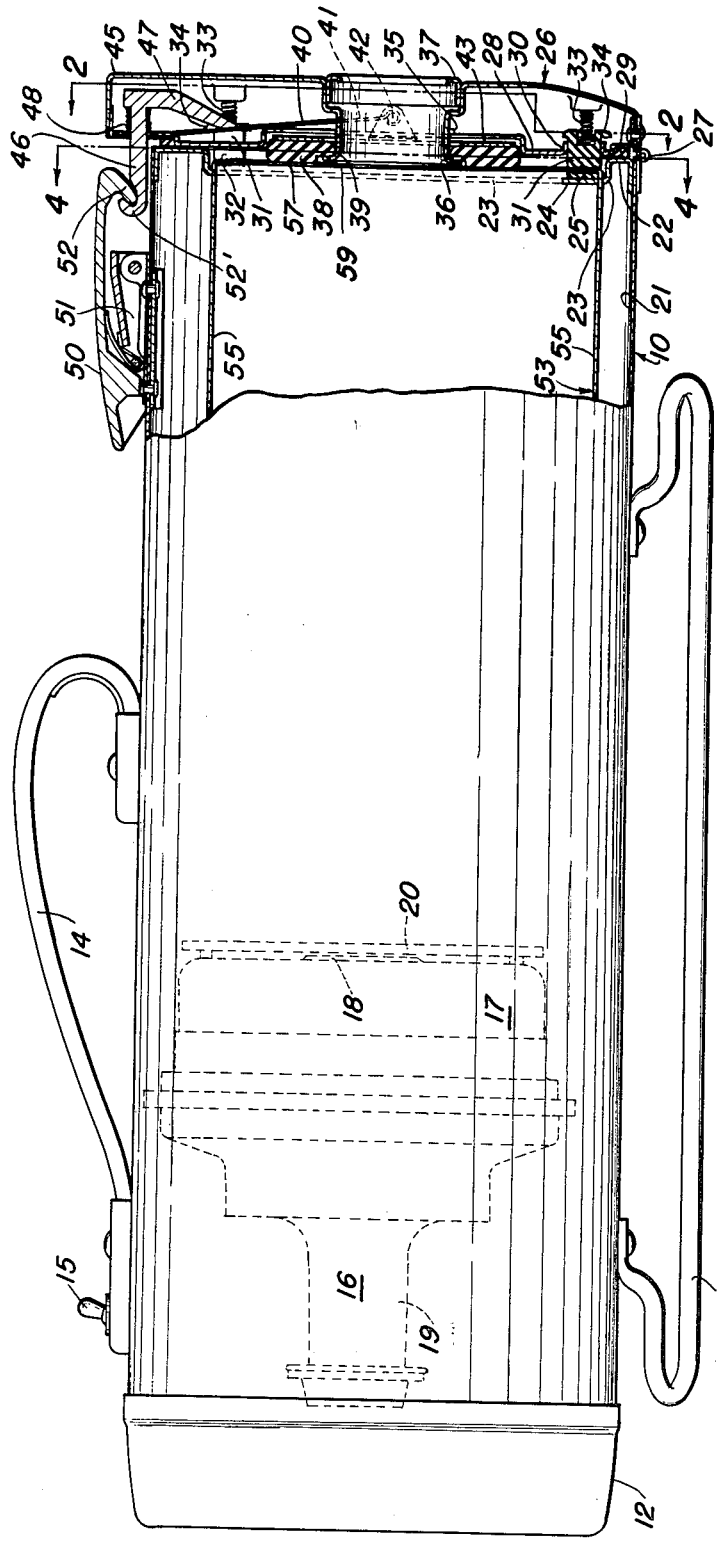
Figure 1 is a side elevational view partly in section illustrating one embodiment of the invention.
Figure 4:
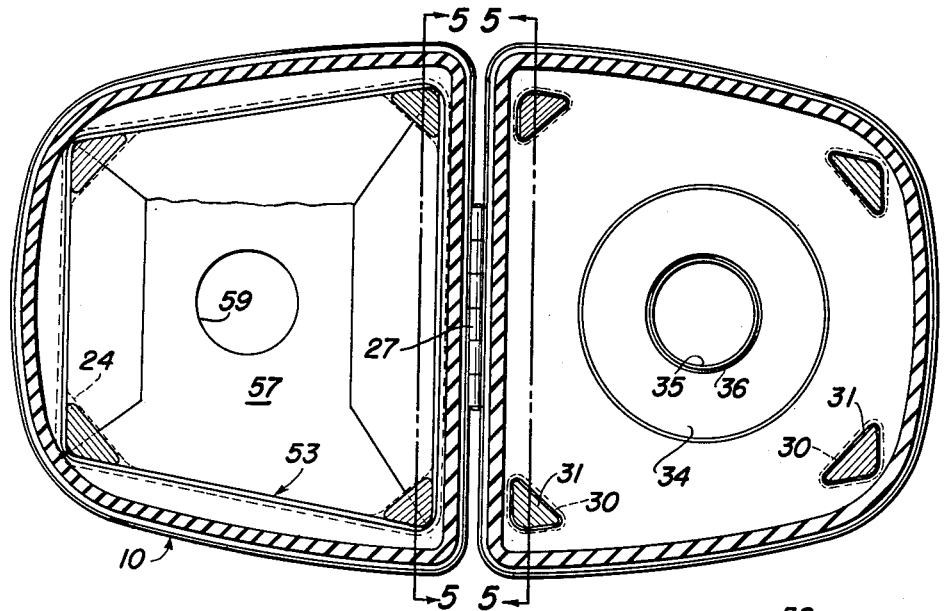
Figure 4 is a plan view across the open end of the cleaner and showing a filter bag in place in the filter chamber.

Referring now to Figures 1 to 5, it will be seen that my suction cleaner comprises a tubular main casing 10 closed at its rear end by an end cap 12 and provided with a pair of supporting runners or skids 13 along its lower side. A carrying handle 14 is secured to the upper side. A toggle switch 15 for the motor-fan unit 16 is shown as mounted at one end of the cleaner carrying handle. The motor-fan unit is of conventional design and need not be described in detail since it does not of itself constitute a novel feature of the invention. Suffice it to say that it preferably includes a multiple stage suction fan 17 having an axially disposed air inlet 18. The fan is driven by an electric motor 19 directly coupled to it. The air discharged by the fan cools the motor as it passes thereover to the exhaust outlet located in the end wall of cap 12. A final filter pad 20 overlies the fan inlet to remove any fine particles of dirt which may pass through the walls of the filter bag.

The major portion of the forward end of casing 10 forms a filter chamber 21 within which my disposable filter bag is housed. The foremost end of this chamber is provided with an inwardly flanged filter mounting ring 22 secured to the edge of casing 10 by spot welding or the like. The side walls of the inwardly extending flanges 23 preferably form a polygon of a shape generally corresponding to that of the cleaner casing and more particularly that of the filter end wall. This polygon may be square, rectangular or other shape but as herein shown, it is of trapezoidal shape with the narrower side extending across the top of a cleaner casing. This filter shape has the advantage of fitting efficiently in a cleaner casing of pleasing appearance and a rounded trapezoidal cross section. Bridging the innermost corners of the trapezoidally arranged flanges 23 are triangular filter supporting shelves 24 to the outer face of which are secured corrugated resilient pads 25. The corners of the filter end wall are clamped against these pads in a manner to be described presently. Note that shelves 24 are located in a plane offset inwardly from the open end of the filter chamber.

The lower rim of end cap 26 is hinged to the edge of the filter chamber opening at 27 and its inner wall 28 is provided with the usual resilient rubber gasket 29 positioned to seat against the outer face of ring 22 and form an airtight seal therewith when the end cap is locked closed. Slidably supported in thimbles 30 of triangular cross section are four similarly shaped rubber clamping feet 31 having corrugations 32 on their inner ends disposed to mesh with the corrugations in rubber pads 25. Clamping feet 31 are urged inwardly toward the filter chamber by compression springs 33 bearing against the outer wall of the end cap and having their opposite ends seated in wells in the ends of the feet. Rims 34 on the end of feet 31 limit the movement of the feet inwardly by contact with the rim of the thimbles as made clear by the drawings.

The end cap is provided with a combined air inlet passage and suction hose coupling 35 having an outwardly flaring lip 36 at its inner end. The outer end of socket 35 is provided with a notched detent ring 37 which engages a pin carried by the hose to hold it seated in socket 35. Note that lip 36 terminates in a plane spaced slightly outward of the plane of pads 25.

Surrounding socket 35 is a rather thick soft rubber sealing pad 38 having an inner opening 39 slightly larger than the outer diameter of the socket. Pad 38 is supported by a leaf spring 40 having a bifurcated end 41 straddling the hose socket and pivotally connected at 42 to a ring 43 secured to the sealing pad. The opposite end 44 of spring 40 extends into a dog house 45 formed in the top edge of the end cap. An L-shaped detent member 46 has one leg extending through openings in the leaf spring and the inner wall of the end cap. The other leg 47 of the detent overlies the mid-portion of spring 40 and is operative to apply pressure against the spring 40 when the end cap is locked in closed position. When the end cap is unlatched, detent 46 is urged to move toward the right, as viewed in Figure 1, by a rather stiff compression spring 48 having one end resting against spring 40 and the other end bearing against leg 47 of the detent. Spring 40, when not depressed by detent leg 47, is so shaped as to hold the sealing pad 38 retracted against a top flange 49 formed in the inner wall of the end cap. However, if detent 46 is moved in a direction to compress spring 48, then the end of leg 47 contacts spring 40 and depresses it to move the pad inwardly against the bottom of a filter bag in a manner which will be explained more fully below.

Figure 3:
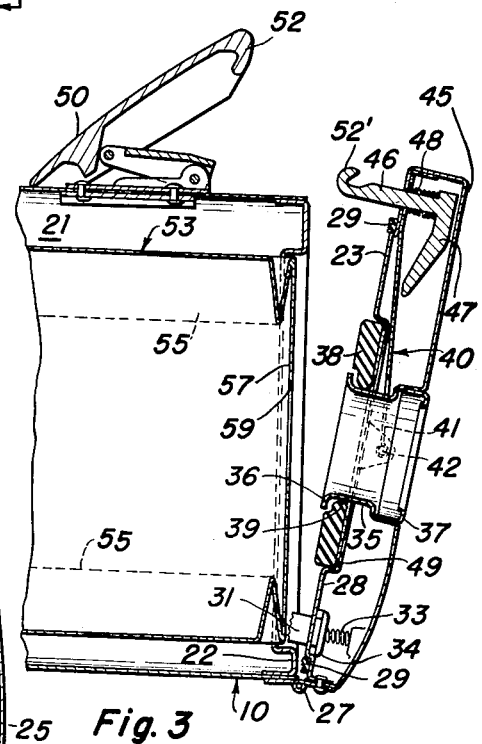
Figure 3 is a fragmentary vertical sectional view through the cleaner showing the end cap approaching closed position.
Figure 2:
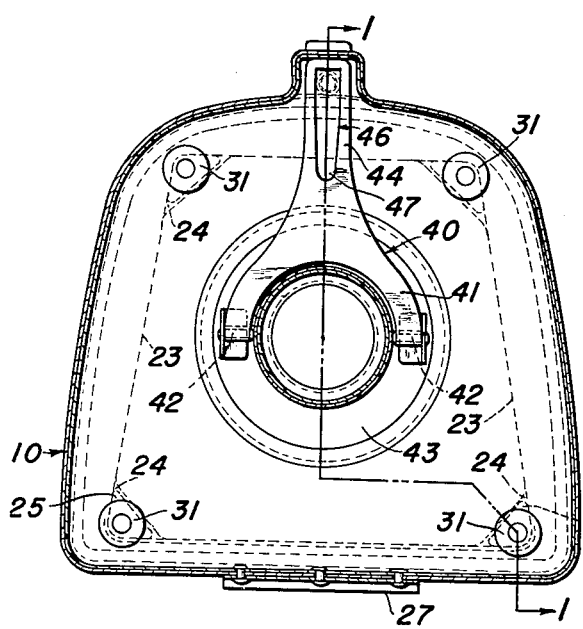
Figure 2 is a vertical sectional view taken along line 2—2 on Figure 1.

The end cap is held closed as by a toggle clamp comprising a latch member 50 pivoted to the top of the cleaner casing through a link 51. The hooked forward end 52 of the latch engages a complementary formed hooked end 52' of the protruding end of member 46. Figure 1 shows the toggle clamp closed and sealing pad 38 held snugly depressed against the bottom 57 of the paper filter bag 53. When the toggle clamp is lifted upwardly to open the same as illustrated in Figure 3, the interengaging hooks 52 and 52' become disconnected allowing the end cap to open. As the toggle clamp opens, spring 48 moves detent 46 away from spring 40 and relieves the pressure thereon so that the spring is free to move the sealing pad back against the stop provided by flange 49.

Figure 6:
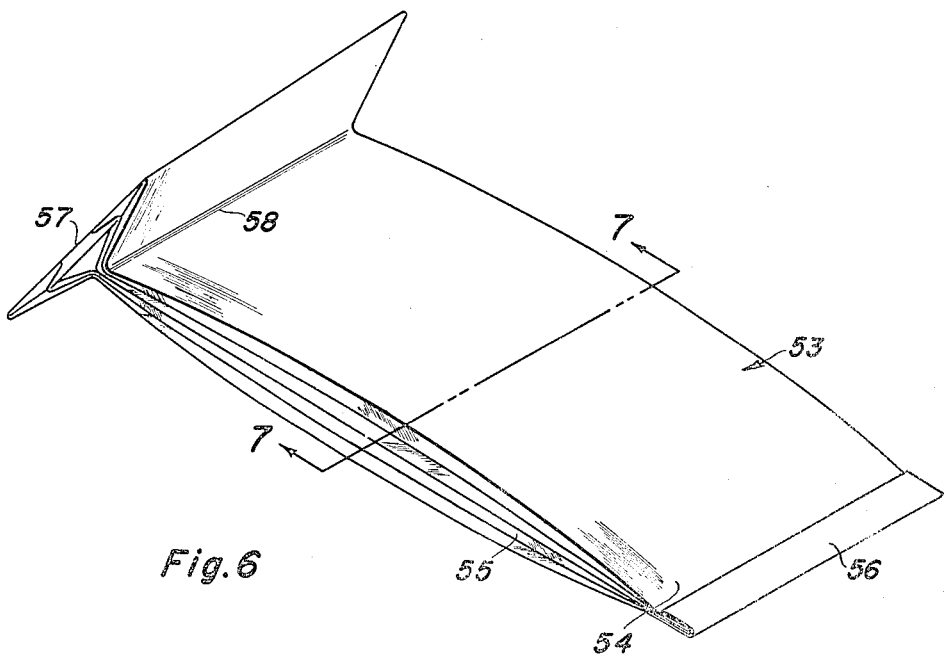
Figure 6 is an isometric view of the throw-away paper filter bag.

My one piece paper filter bag generally designated 53 is best shown in Figure 6. It includes a tubular main body 54 having a plurality of inwardly extending pleats 55 along its opposite sides. One end is preferably turned over against one of the flat sides and sealed closed as indicated at 56. As herein illustrated, the opposite side walls of the main body are flat and of the same width. However, the intervening pleated walls are of unequal widths and extend along the upper and lower sides of the filter chamber, as will be apparent from Figures 2 and 4. The bottom end 57 of the filter is formed from the overlapping inturned end portions of the side walls of the main body. Since the pleated upper and lower sides of the main body are here illustrated as being of unequal widths the resulting shape of the end wall 57 is trapezoidal and the area is preferably slightly less than that defined by the inturned flanges 23 of the filter mounting ring. As a result of the complementary shape of the guide channels and of the filter end wall, the filter is readily assembled to the mounting ring by gravity action provided it is properly oriented.

The pleated sides of the bag are creased in a manner to provide one or more inwardly extending pleats 55 which permits the body of the bag to fold flat and one of the flat side walls is creased crosswise thereof as indicated at 58 in Figure 6 so that the flat bottom can be folded to lie in the same plane as the flat body of the bag for compact packaging and shipment. Centrally disposed in the flat bottom 57 of the bag is an air inlet opening 59. This opening is so positioned as to register with the air passage in hose socket 35 when the filter is properly assembled within the filter chamber.

Figure 5:
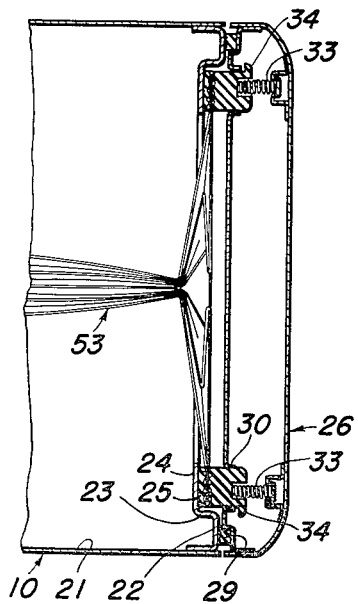
Figure 5 is a view similar to Figure 1 and taken along line 5—5 on Figure 4.
Figure 7:
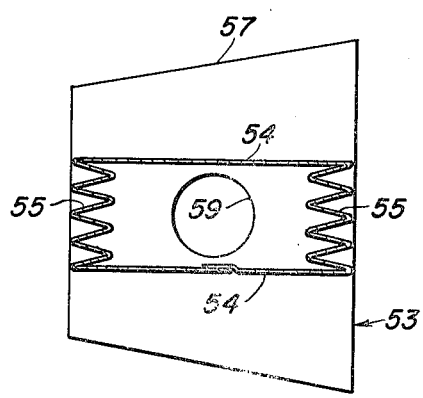
Figure 7 is a cross sectional view taken along line 8—8 on Figure 6.

Figure 1 shows a filter bag clamped in place in the cleaner and all walls fully inflated to a diameter somewhat less than that of the filter chamber thereby leaving a free air passage for the flow of filtered air to the motor-fan unit. Figure 5 shows a newly installed but uninflated filter bag clamped in place in the cleaner. As soon as the motor-fan unit is energized, the filter will expand immediately to the inflated condition illustrated in Figure 1.

*Operation*

Let it be assumed that the cleaner is upended onto rear cap 12 and that end cap 26 is in open position in readiness for the installation of a new filter bag. A new bag taken from the shipping carton is folded flat with the flat bottom folded against one of the flat side walls along crease line 58. The operator grasps one edge of the bottom and pivots it through an arc of 90 degrees until it lies normal to the main body of the bag as shown in Figure 6. The bag is then dropped into the open topped filter chamber so that the corners of the still flat bottom rest on pads 25 of shelves 24. If by chance the operator should drop the bag into the upended cleaner in any except the proper orientation, the error will be readily apparent since it will be impossible to seat the corners of the bag on the shelves. It will then be necessary to rotate the filter bag until the trapezoidal end wall of the filter is in a proper position to fit within the trapezoidal opening formed by flanges 23 of ring 22. The operator then swings the end cap to closed position and closes the toggle clamp to lock it in place. As the toggle clamp 50 is closed the reciprocating L-shaped detent 46 reciprocally mounted within the end cap is moved in a direction to compress spring 48. As this occurs the end of leg 47 bears against leaf spring 40 and depresses it clockwise as viewed in Figure 1 and in a manner to bring sealing pad 38 tightly against the taut bottom 57 of the filter. At the same time the inner edge of the pad contacts flange 36 of the hose socket and forms an airtight seal therewith.

It will also be obvious from the foregoing that as the end cap closes, clamping legs 31 contact the outer corners of the filter bag bottom and cooperate with pads 25 to tightly grip and clamp the filter. Feet 31 are resiliently held in this clamping position by means of compression springs 33. And, of course, the clamping action on the corners of the filter bottom occur before the end cap is fully closed and before spring 40 is depressed to bring the sealing pad 38 into sealing position against the bottom of the bag.

The cleaner is now ready for operation and may be returned to its normal operating position on skids 13. The usual suction hose and cleaning tools are snapped in position in hose socket 35 and switch 15 is closed to energize the motor-fan unit. As soon as the motor is energized, the suction pressure inflates the filter to its full volume.

It is a simple matter to remove a dirt filled filter and replace it with a clean filter. The operator first disconnects the suction hose and then upends the cleaner so that it is supported on the rear end cap 12. She then opens the toggle clamp and swings the end cap to its open position. As the toggle clamp starts to open, spring 48 expands and relieves the pressure on spring 40 so that pad 48 moves away from the bottom of the bag. As soon as the end cap starts to open, clamping feet 31 move outwardly under the influence of springs 33 until flanges 34 contact the upturned edges of thimbles 30 and limit the movement of the legs. All that remains is for the operator to place her finger beneath the rim of the filter bottom and withdraw it upwardly from the filter chamber. All the dirt remains at the lowermost end of the bag and accordingly, it is impossible for dirt to escape into the room during the removal operation. A new filter is installed in the same manner described above and the cleaner is ready for continued cleaning operation.

Second embodiment

A second embodiment illustrated in Figures 8 and 9 is generally similar to that described above. Accordingly, the same or similar parts are designated by the same reference numerals distinguished by a prime. For the most part, the parts will not be re-described since the general construction can be readily understood from the description given above.

The second embodiment differs from the first in that each of the filter supporting shelves 24' is provided with anchoring pins 60 having rounded or pointed free ends which act as pilots in guiding the filter bag into position thereover. Pins 60 are secured to the shelves and extend upwardly through rubber pads 25' so as to project a slight distance into wells 61 extending axially into each of the clamping feet 31'.

As best made clear by Figure 9, the throw-away paper filter bag 53' is substantialy identical with the one described above except that each of the four corners of the flat end 57' are provided with metal grommets or eyelets 62 having an opening therethrough somewhat larger than the outer diameter of anchor pins 60. It will, of course, be understood that eyelets 62 are assembled to the corners of the filter bag while the flat bottom is held substantially in the position shown in Figure 6. Accordingly, the eyelets not only pass through the end wall itself but through the directly opposite portion of the flat side wall of the bag while the same lies folded against the end wall of the bag.

The filter bag of the second embodiment is installed in the cleaner in exactly the same manner described above for the first embodiment except that eyelets 62 telescope over the pointed ends of anchor pins 60 as the filter drops into place on pads 25'. The bottom of the bag is, of course, folded to a position normal to the deflated main body of the bag during the assembly operation as best illustrated in Figure 5 in connection with the first embodiment. Anchor pins 60 accurately position the filter bag on rubber pads 25' carried by the triangularly shaped shelves 24' and prevent shifting or accidental displacement of the filter while the end cap is being closed. Pins 60 also assure that the filter is in the proper oriented position to seat within the trapezoidal shaped seating guide provided by the downturned rim 23' of the filter mounting ring 22'.

As the end cap 26' is swung to closed position across the end of the filter chamber, the pair of clamping feet 31' adjacent hinge 27' telescope over the ends of the associated anchor pins 60 and depress the two lower corners of the filter into firm seating contact with rubber pads 25'. As the cover closes further, springs 33' are compressed thereby adding further clamping pressure on the two lower corners of the filter. As this occurs the upper pair of clamping feet 31' telescope over the two upper pins 60 and clamp the upper corners of the filter against pads 25' in a similar manner. During this part of the closing operation, the thick and spongy sealing pad 38' remains retracted against flange 49' under the influence of leaf spring 40'. The operator now engages the toggle clamp 50' with the hooked end 52' of detent 46'. As the toggle clamp is closed, compression spring 48' is compressed and the inner end of legs 47' contacts springs 40' and pivots the sealing pad 38' downwardly into airtight sealing engagement with the end wall of the filter bag. As soon as the motor-fan unit is energized, the filter bag inflates fully and the pleated upper and lower walls of the filter bag are opened outwardly and in spaced parallel relationship to the upper and lower sides of the filter chamber.

It is, of course, desirable that sealing pads 38' bear against the bottom of the bag with sufficient pressure to provide an airtight seal. It has been found in some instances that this pressure may cause creeping of the bag corners from between the corrugated clamping faces of pads 25' and feet 31'. This possibility is positively safeguarded against in the second embodiment by reason of the interlock provided by anchor pins 60 and eyelets 62. In addition, the eyelets reinforce the corners of the bag and strengthen them against tearing. These several advantages are obtained at the insignificant cost involved in providing the filter bag with the eyelets. The latter are placed in the bottom of the bag simultaneously by an automatic eyelet press as the filter issues from the automatic bag folding and sealing machine.

As will be readily apparent from the second embodiment of the cooperative action of anchor pins 60 and eyelets 62 obviates the need for the filter assembly guide provided by flanges 23' of the filter mounting ring since it is merely necessary for the operator to drop the filter into the cleaner so that the eyelets register with the anchor pins 60. However, the guiding action performed by flanges 23' is very helpful in guiding the bottom of the filter bag into proper registry with pins 60 and are preferably incorporated in both embodiments.

While I have shown and described but two embodiments of my invention, it is to be understood that these embodiments are to be taken as illustrative only and not in a limiting sense. I do not wish to be limited to the particular structure shown and described but to include all equivalent variations except as limited by the scope of the claims.

I claim:

1. In combination, a suction cleaner having a casing providing a motor-fan unit compartment and a filter chamber, said casing having a large area opening for the insertion and removal of a filter bag; a throw-away paper filter having a pair of side walls and oppositely disposed pleated side walls intermediate the first said side walls and a flat end, said pleated side walls being folded flat with portions of the first said side walls lying against the end wall means carried by said filter chamber inwardly of said large area opening providing ledges for supporting the corners of said filter end wall and the juxtaposed portions of the first said side walls as said filter is dropped into said filter chamber, a closure member for said casing opening, means carried by said closure member in alignment with said ledges and cooperative therewith to clamp the corners of said filter end wall in place as said closure member is closed, whereby the filter bag is expanded to its full cross-sectional area upon operation of the cleaner, and means for securing said closure member in place across said opening.

2. The combination defined in claim 1 wherein said filter end wall is provided with an air inlet opening, and wherein said closure member is provided with an air passage therethrough positioned to register with said filter inlet when said closure is secured in place over said casing opening.

3. The combination defined in claim 2 including means carried by said closure member and cooperating with the air passage therethrough and with the end wall of said filter to form an airtight seal about said air inlet opening when said closure member is secured in place over the opening to said filter chamber.

4. A suction cleaner having a large filter chamber provided with a large area trapezoidal shaped opening through one wall thereof, means projecting across the corners of said trapezoidal opening providing a plurality of spaced apart filter supporting shelves, a filter bag having a trapezoidal end wall and integral side walls extending laterally therefrom, portions of said side walls being disposed in juxtaposition to the filter end wall, said juxtaposed portions of the side walls and end wall being seated on said filter supporting shelves, a closure member for said filter chamber opening, resiliently supported clamping members carried on the inner side of said closure member opposite said filter supporting shelves operable to clamp filter end wall in place on said shelves when said closure member is in place across said opening, whereby the filter is expanded to its full cross-sectional area upon operation of the cleaner, and means for clamping said closure member in place across said opening.

5. A suction cleaner having a filter chamber provided with a large area opening in the wall thereof of polygonal shape, means providing shelves extending across the corners of said opening, a filter bag with an end wall having a shape and size similar to said opening but of slightly smaller area whereby the filter can be readily inserted and withdrawn through said opening, filter side walls integral with the end wall, portions of said side walls lying flat against the end wall, said shelves providing supports for the juxtaposed portions of the end wall and side walls, and means pivotally supported adjacent a rim of said opening and movable into engagement with the outer face of the end wall of a filter bag suspended from said shelves and cooperating with the latter to clamp the corners of the filter bag end wall in place in said filter chamber with the end wall disposed across and close to the large area opening in the wall of said filter chamber.

6. A suction cleaner having a casing forming a filter chamber provided with a large area opening through a wall thereof, a filter supporting member carried by said casing adjacent the plane of said opening, said supporting member having a large opening therethrough of polygonal shape and having an area somewhat smaller than the cross sectional area of said filter chamber, whereby a disposable filter bag can be readily inserted and withdrawn through said opening, filter bag supporting shelves extending across the corners of the polygonal shaped opening in said filter supporting member, said shelves being located on a plane offset inwardly from the outer face of said filter supporting member, a paper filter bag adapted to be supported on said shelves, said filter bag having a tubular main body having a flat end wall of a shape and size corresponding to that of said polygonal opening but of slightly smaller area whereby said bag can be inserted through said casing opening with the corners of said end wall seated on the shelves of said filter supporting member, said tubular main body having opposite sides with portions thereof folded flat against the end wall, means carried by said cleaner casing for releasably clamping the corners of said end wall and the juxtaposed portions of the sides of the tubular main body in place against said shelves, said filter end wall having an air inlet opening therethrough, and means for connecting a dirty air supply duct to said filter inlet.

7. A throw away paper filter bag for use in a suction cleaner, said filter being made of air pervious paper stock and having a tubular main body, inwardly folding pleats extending along the opposite sides of said main body, one end of said main body being flat and being disposed substantially at right angles to the walls of the main body when said filter is inflated, said main body being creased in such manner that said flat end folds downwardly thereagainst when the pleats of said main body are collapsed and folded flat against one another, the corners of said flat end and the adjacent corners of the side walls having reinforced eyelets therethrough adapted to seat over the ends of mounting pins carried by the filter chamber of a suction cleaner, and means closing the other end of said main body to provide a non-refillable paper filter bag.

8. A suction cleaner having a tubular filter chamber open at one end, a filter mounting ring secured to said chamber adjacent said open end, said ring having filter supporting shelves extending across the oppositely disposed rim edges thereof, filter anchoring pins secured to said shelves and projecting outwardly toward the open end of said filter chamber, a tubular filter bag adapted to be housed within said filter chamber and having a closed flat end and side walls, portions of said side walls being disposed in juxtaposition to the flat end, eyelets extending through the oppositely disposed rim edges of said flat end and the adjacent side wall portions of said filter bag spaced to seat over said anchor pins and cooperating therewith to support said filter bag within said filter chamber, and means for clamping said filter in place on said pins.

9. A suction cleaner as defined in claim 8 wherein said means for clamping said filter in place on said anchoring pins includes an end cap for the open end of said filter chamber.

10. A suction cleaner as defined in claim 8 including an end cap for the open end of said filter chamber, hinge means pivotally connecting one end of said end cap to said filter chamber, said end cap having an air passageway extending therethrough terminating adjacent the flat end of said filter bag, the flat end of said filter bag having an air inlet positioned to register with the inner end of said air passageway when said end cap is closed, and manually operable means for holding said end cap closed.

11. A suction cleaner as defined in claim 8 wherein said filter clamping means includes an end cap for the open end of said filter chamber, said end cap having means providing an air passage therethrough terminating adjacent the flat end of said filter bag, an air inlet through the flat end of said filter adapted to register with the said air passage when said end cap is closed, a resilient air sealing collar carried by said end cap surrounding the inner end of said air passage adapted to seat against the rim of the air inlet to said filter bag, and resilient means for holding said end cap closed and for holding said sealing ring against the flat end of said filter.

12. A suction cleaner having an open ended filter chamber, means for supporting a closed end filter bag in place in said chamber with one end adjacent the open end of said chamber, said filter bag having an inlet opening in said one end, an end cap having one edge hinged to the open end of said filter chamber, an air conduit through said end cap positioned in alignment with the filter inlet opening, a resilient sealing collar surrounding the inner end of said air conduit, said sealing collar being movable relatively to the air conduit, and common means for locking said end cap closed and for depressing said sealing collar relatively to the air conduit against the rim of the inlet opening of a filter supported within said filter chamber, to form an airtight junction between the air conduit and the filter inlet opening.

13. An end cap for a suction cleaner filter chamber having an access opening, said end cap having a combined air conduit and suction hose socket extending therethrough, said air conduit being adapted to be connected to the inlet of a filter bag, a resilient air seal gasket surrounding the inner end of said conduit and adapted to form an airtight seal between said conduit and the inlet of a filter bag, latch detent means carried by said end cap for holding the latter in place across a filter chamber access opening, and including a resilient connection with said air seal gasket and operative to depress the latter away from the inner side of said end cap when the end cap is locked in place across the opening of a filter chamber.

14. An end cap for a suction cleaner as defined in claim 13 including a plurality of spring biased filter clamping members reciprocably supported in openings through the inner face of said end cap, said filter clamping members being mounted adjacent the rim of said end cap and adapted to engage the outer corners of a flat ended paper filter bag and hold the same clamped against an underlying filter supporting ledge of a suction cleaner filter chamber when the end cap is secured in place thereon.

References Cited in the file of this patent

UNITED STATES PATENTS

| | | |
|---|---|---|
| 1,832,846 | Gudka | Nov. 24, 1931 |
| 2,153,580 | Lynger | Apr. 11, 1939 |
| 2,388,280 | Nuffer et al. | Nov. 6, 1945 |
| 2,571,125 | Ferraris | Oct. 16, 1951 |
| 2,580,645 | Doughman | Jan. 1, 1952 |
| 2,621,757 | Anderson | Dec. 16, 1952 |